US008109729B2

(12) United States Patent
Andersen

(10) Patent No.: US 8,109,729 B2
(45) Date of Patent: Feb. 7, 2012

(54) WIND TURBINE AND A PITCH BEARING FOR A WIND TURBINE

(75) Inventor: Jesper Lykkegaard Andersen, Hornslet (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/071,080

(22) Filed: Mar. 24, 2011

(65) Prior Publication Data
US 2011/0243738 A1 Oct. 6, 2011

Related U.S. Application Data

(60) Provisional application No. 61/318,611, filed on Mar. 29, 2010.

(30) Foreign Application Priority Data

Mar. 29, 2010 (DK) .................................. 2010 00260

(51) Int. Cl.
F03D 11/00 (2006.01)
(52) U.S. Cl. ........................................ 416/147; 416/205
(58) Field of Classification Search .................... 416/41, 416/98, 147, 155, 159, 162, 204 R, 205, 239
See application file for complete search history.

(56) References Cited

U.S. PATENT DOCUMENTS 7,854,592 B2 * 12/2010 Bech .............................. 416/155
8,047,792 B2 * 11/2011 Bech et al. .................... 416/147
2008/0199315 A1 * 8/2008 Bech ................................ 416/61
2008/0213095 A1 * 9/2008 Bech et al. ..................... 416/131
2009/0285693 A1 * 11/2009 Bech ............................. 416/248

FOREIGN PATENT DOCUMENTS

| EP | 1 266 137 | 12/2002 |
|---|---|---|
| EP | 1 741 940 | 1/2007 |
| EP | 1 741 943 | 1/2007 |
| WO | 2007/006301 | 1/2007 |

OTHER PUBLICATIONS

Philipp Westermayer; Search Report issued in related European Patent Application No. EP 11 00 2339; May 9, 2011; 6 pages; European Patent Office.
Carsten Nielsen; 1st Technical Examination Report issued in priority Denmark Application No. PA 2010 00260; Nov. 11, 2010; 4 pages; Denmark Patent and Trademark Office.

* cited by examiner

Primary Examiner — Nathaniel Wiehe
(74) Attorney, Agent, or Firm — Wood, Herron & Evans, L.L.P.

(57) ABSTRACT

A wind turbine includes a rotor having a rotational axis and a wind turbine blade connected to a hub through a pitch bearing. The pitch bearing includes an outer ring, a center ring and an inner ring. The pitch bearing further includes a first rolling element arrangement having at least two rows of rolling elements between the center ring and one of the inner and outer rings, and a second rolling element arrangement having at least one row of rolling elements between the center ring and the other of the inner and outer rings. A first row of the at least two rows is arranged at a first distance from the rotational axis, and a second row of the at least two rows is arranged at a second distance from the rotational axis greater than the first distance. A pitch bearing for a wind turbine is also disclosed.

25 Claims, 9 Drawing Sheets

WIND TURBINE AND A PITCH BEARING FOR A WIND TURBINE

CROSS REFERENCE TO RELATED APPLICATIONS

This application claims priority under 35 U.S.C. §119(a) to DK Application No. PA 2010 00260, filed Mar. 29, 2010. This application also claims the benefit of U.S. Provisional Application Ser. No. 61/318,611, filed Mar. 29, 2010. Each of these applications is incorporated by reference herein in its entirety.

TECHNICAL FIELD

The invention relates to a wind turbine comprising a rotor including at least one wind turbine blade connected to a rotor hub through at least one pitch bearing, wherein said at least one pitch bearing comprises at least one outer ring, at least one centre ring and at least one inner ring. The invention further relates to a pitch bearing for a wind turbine.

BACKGROUND

A wind turbine known in the art comprises a wind turbine tower and a wind turbine nacelle positioned on top of the tower. A wind turbine rotor with three wind turbine blades is connected to the nacelle through a low speed shaft, as illustrated in FIG. 1.

Modern wind turbines control the load on the rotor by pitching the blades in and out of the incoming wind. The blades are pitched to optimize the output or to protect the wind turbine from damaging overloads.

To perform the pitch, each blade is provided with a pitching arrangement comprising a pitch bearing between the hub and the blade, and some sort of mechanism, most often a hydraulic cylinder or an electrical motor, to provide the force for pitching the blade and maintaining it in a given position. This pitching arrangement typically enables each blade to be turned at least 60° around their longitudinal axis.

As the size of the modern wind turbines increases, the load, on most of the different parts which a wind turbine consists of, also increases. Notably, the loads on the pitching arrangement are significantly increased due to increased blade size and overall power output of the wind turbine.

From European patent application EP 1 741 943 A2 it is therefore known to use a three ring bearing as a wind turbine bearing. However, the inner and outer rings of a three ring bearing have a tendency to deflect outwards and away from the centre ring when the bearing is subject to large axial loads. When the inner and outer rings is fixed, for example, against the rotor hub at a bottom end of the rings, the upper ends of the rings will deflect more than the bottom ends. Three ring bearings are usually provided with at least two rows of rolling elements between the centre ring and a first ring of the outer and the inner ring, and at least one row of rolling elements between the centre ring and the second ring of the outer and the inner ring. This ensures that the large axial loads are transferred between the rings by means of as many contact surfaces as possible given weight, financial and manufacturing considerations. But, if one end of the bearing rings deflect more than the other, the loads are not distributed evenly between the at least two rows of rolling elements. That is, the heavier the bearing is loaded, the more uneven the loads are distributed between the at least two rows of rolling elements.

In EP 1 741 943 A2, a solution to this problem is postulated and includes supporting the outer ring near its contact surface by means of a supporting part or by reinforcing the outer ring by increasing the thickness of the ring the further away from the contact surface it extends. However, supporting the outer ring requires a close fit with the supporting part thereby increasing the manufacturing cost of both the outer ring and the supporting part and such a solution makes it considerably more difficult to mount and dismount the bearing. Moreover, reinforcing the rings to compensate for the tendency to deflect increases both the weight and the cost of the ring considerably.

Accordingly, an aspect of the invention is to provide a wind turbine pitch bearing design with an improved load distribution.

SUMMARY

An embodiment of the invention provides for a wind turbine comprising a rotor including an axis of rotation, and further including at least one wind turbine blade connected to a rotor hub through at least one pitch bearing. The at least one pitch bearing comprises at least one outer ring, at least one centre ring, and at least one inner ring.

The at least one pitch bearing further comprises a first rolling element arrangement including at least two separate rows of rolling elements arranged between the centre ring and a first ring of the inner ring and the outer ring, and a second rolling element arrangement including at least one row of rolling elements arranged between the centre ring and a second ring of the inner ring and the outer ring.

A first row of the at least two separate rows of rolling elements is arranged at a first row distance from the rotor axis of rotation, and a second row of the at least two separate rows of rolling elements is arranged at a second row distance from the rotor axis of rotation, wherein the first row distance is smaller than the second row distance.

The first ring comprises a support part including a support face substantially facing the centre ring and including a back face substantially facing away from the centre ring, wherein the at least two separate rows of rolling elements are supported against the support face.

A contact surface part protrudes from the back face, wherein the contact surface part includes a contact face substantially facing in a general axial direction towards the rotor axis of rotation, and wherein the contact face is fixed towards a corresponding hub contact surface.

The contact face is arranged at a contact face distance from the rotor axis of rotation, wherein the first row distance is smaller than the contact face distance.

Providing the support part with a contact surface part is advantageous in that it increases the rigidity of the bearing ring locally, thereby providing improved control of the local deflection rate of the bearing ring.

Furthermore, positioning the contact surface part on the support part so that the contact face of the contact surface part is further away from the rotor axis of rotation than the first row of rolling elements is advantageous in that this bearing ring design ensures that the support part is more flexible at the first row of rolling elements than at the second row of rolling elements, thereby allowing the bearing ring to more easily deflect at the first row of rolling elements so that the deflection, previously explained in relation to prior art pitch bearings, is better balanced thereby ensuring a better load distribution between the two rows of rolling elements.

Even further, providing the bearing ring fixation in the contact surface part protruding from the back side of the support is also advantageous in that it allows the bearing ring fixation to be moved further away from the rows of rolling elements so that bearing fixation has less of an influence on the bearing deflection, and it is easier to control the deflection of the bearing ring by means of its rigidity.

It should be noted that the term "the contact face is fixed towards a corresponding hub contact surface" includes both that the contact face is fixed directly against the hub contact surface, or that the contact face is fixed indirectly against the hub contact surface through some intermediate additional part formed separate form both the bearing and the hub.

Embodiment of the invention further provide a wind turbine comprising a rotor including an axis of rotation, and further including at least one wind turbine blade connected to a rotor hub through at least one pitch bearing.

The at least one pitch bearing comprises at least one outer ring, at least one centre ring and at least one inner ring, wherein the at least one pitch bearing further comprises a first rolling element arrangement including at least two separate rows of rolling elements arranged between the centre ring and a first ring of the inner ring and the outer ring, and a second rolling element arrangement including at least one row of rolling elements arranged between the centre ring and a second ring of the inner ring and the outer ring.

A first row of the at least two separate rows of rolling elements is arranged at a first row distance from the rotor axis of rotation, and a second row of the at least two separate rows of rolling elements is arranged at a second row distance from the rotor axis of rotation, wherein the second row distance is smaller than the first row distance.

The first ring comprises a support part including a support face substantially facing the centre ring and including a back face substantially facing away from the centre ring, wherein the at least two separate rows of rolling elements are supported against the support face.

A contact surface part protrudes from the back face, wherein the contact surface part includes a contact face substantially facing in a general axial direction away from the rotor axis of rotation, and wherein the contact face is fixed towards a corresponding blade contact surface.

The contact face is arranged at a contact face distance from the rotor axis of rotation, and the contact face distance is smaller than the first row distance.

Also for this embodiment of the invention, it applies that providing the support part with a contact surface part is advantageous in that it increases the rigidity of the bearing ring locally, thereby providing improved control of the local deflection rate of the bearing ring.

Furthermore, positioning the contact surface part on the support part so that the contact face of the contact surface part is closer to the rotor axis of rotation than the first row of rolling elements is advantageous in that this bearing ring design ensures that the support part is more flexible at the first row of rolling elements than at the second row of rolling elements, thereby allowing the bearing ring to more easily deflect at the first row of rolling elements so that the deflection, previously explained in relation to prior art pitch bearings, is better balanced thereby ensuring a better load distribution between the two rows of rolling elements.

Even further, providing the bearing ring fixation in the contact surface part protruding from the back side of the support is also advantageous in that it allows the bearing ring fixation to be moved further away from the rows of rolling elements so that bearing fixation has less of an influence on the bearing deflection, and it is easier to control the deflection of the bearing ring by means of it rigidity.

It should be emphasised that the term "substantially facing in a general axial direction towards the rotor axis of rotation" is to be understood as facing in one of two general axial directions: towards or away from the rotor axis of rotation.

Thus, this term does not exclude that the contact face is slanting towards or away from the rotational axis of the bearing, or that the face is round, curved or in another way does not face directly in the specific axial direction of the rotational axis of the rotor. The same applies visa-versa for the term "substantially facing in a general axial direction away from the rotor axis of rotation".

Also here it should be noted that the term "the contact face is fixed towards a corresponding blade contact surface" includes both that the contact face is fixed directly against the blade contact surface, or that the contact face is fixed indirectly against the blade contact surface through some intermediate additional part formed separate from both the bearing and the hub.

In an aspect of the invention, the support part extends into a depression of the hub.

Making the support part extend into a depression is advantageous in that it is thereby possible to allow for a more free and controlled deflection of the support part at the first row of rolling elements.

In an aspect of the invention, the depression is formed integrally with the hub.

Forming the depression integrally with the hub is advantageous in that it simplifies the hub and bearing design and reduces manufacturing costs.

In an aspect of the invention, the deepest depth of the depression is deeper than the greatest extend of the support part, thereby forming a bottom gap between a bottom of the depression and the support part.

Forming the depression so deep that a gap is formed between the bottom of the depression and the support part is advantageous in that it allows the support part to deflect more freely in the depression.

In an aspect of the invention, the outer ring comprises the support part and wherein an outer diameter of the support part is smaller than an outer diameter of the depression, thereby forming an outer gap between the support part of the outer ring and an outer wall of the depression.

Forming the depression so wide that a gap is formed between the outer wall of the depression and the support part is advantageous in that it allows the support part to deflect more freely in the depression.

In an aspect of the invention, the inner ring comprises the support part and wherein an inner diameter of the support part is greater than an inner diameter of the depression, thereby forming an inner gap between the support part of the inner ring and an inner wall of the depression.

Forming the depression so wide that a gap is formed between the inner wall of the depression and the support part is advantageous in that it allows the support part to deflect more freely in the depression.

In an aspect of the invention, the outer ring comprises the support part and the contact surface part, and wherein the contact face of the contact surface part is located further from an axis of rotation of the pitch bearing than the support part.

Thereby is achieved an advantageous embodiment of the invention.

In an aspect of the invention, the inner ring comprises the support part and the contact surface part, and wherein the support part is located further from an axis of rotation of the pitch bearing than the contact face of the contact surface part.

Thereby is achieved an advantageous embodiment of the invention.

In an aspect of the invention, both the inner ring and the outer ring comprise a support part and a contact surface part, and wherein the support part of the inner ring is located further from an axis of rotation of the pitch bearing than the contact face of the contact surface part of the inner ring and wherein the contact face of the contact surface part of the outer ring is located further from an axis of rotation of the pitch bearing than the support part of the outer ring.

Thereby is achieved an advantageous embodiment of the invention.

In an aspect of the invention, the first rolling element arrangement is arranged at a first rolling element distance from an axis of rotation of the pitch bearing and the second rolling element arrangement is arranged at a second rolling element distance from the axis of rotation of the pitch bearing and wherein the first rolling element distance is different from the second rolling element distance.

Positioning the rolling element arrangements at two different radial distances provides for a more advantageous load distribution in and through the bearing.

In an aspect of the invention, the play of the first row of the at least two separate rows of rolling elements is greater than the play of the second row of the at least two separate rows of rolling elements.

Providing the first row of rolling elements with more play than the second row of rolling elements is advantageous in that it allows the rolling elements of the first row to not be loaded as much as the rolling elements of the second row until the bearing is fully loaded at its nominal load. When the bearing is fully loaded, the load transferred between the bearing rings will therefore be distributed more evenly between the two rows.

Even further, aspects of the invention provide for a pitch bearing for a wind turbine. The pitch bearing comprises at least one outer ring, at least one centre ring including a bottom surface and a bottom surface plane, wherein the bottom surface plane is perpendicular to an axis of rotation of the pitch bearing and extending through the bottom surface and at least one inner ring.

The pitch bearing further comprises a first rolling element arrangement including at least two separate rows of rolling elements arranged between the centre ring and a first ring of the inner ring and the outer ring, and a second rolling element arrangement including at least one row of rolling elements arranged between the centre ring and a second ring of the inner ring and the outer ring.

A first row of the at least two separate rows of rolling elements is arranged at a first row distance from the bottom surface plane, wherein a second row of the at least two separate rows of rolling elements is arranged at a second row distance from the bottom surface plane, and wherein the first row distance is smaller than the second row distance.

The first ring comprises a support part including a support face substantially facing the centre ring and including a back face substantially facing away from the centre ring, wherein the at least two separate rows of rolling elements are supported against the support face.

A contact surface part protrudes from the back face, wherein the contact surface part includes a contact face substantially facing in a direction towards the bottom surface plane, wherein the contact face is arranged at a contact face distance from the bottom surface plane, and wherein the first row distance is smaller than the contact face distance.

Thereby is achieved an advantageous embodiment of the invention.

BRIEF DESCRIPTION OF THE DRAWINGS

The invention will be described in the following with reference to the figures in which.

DETAILED DESCRIPTION

Figure 1:
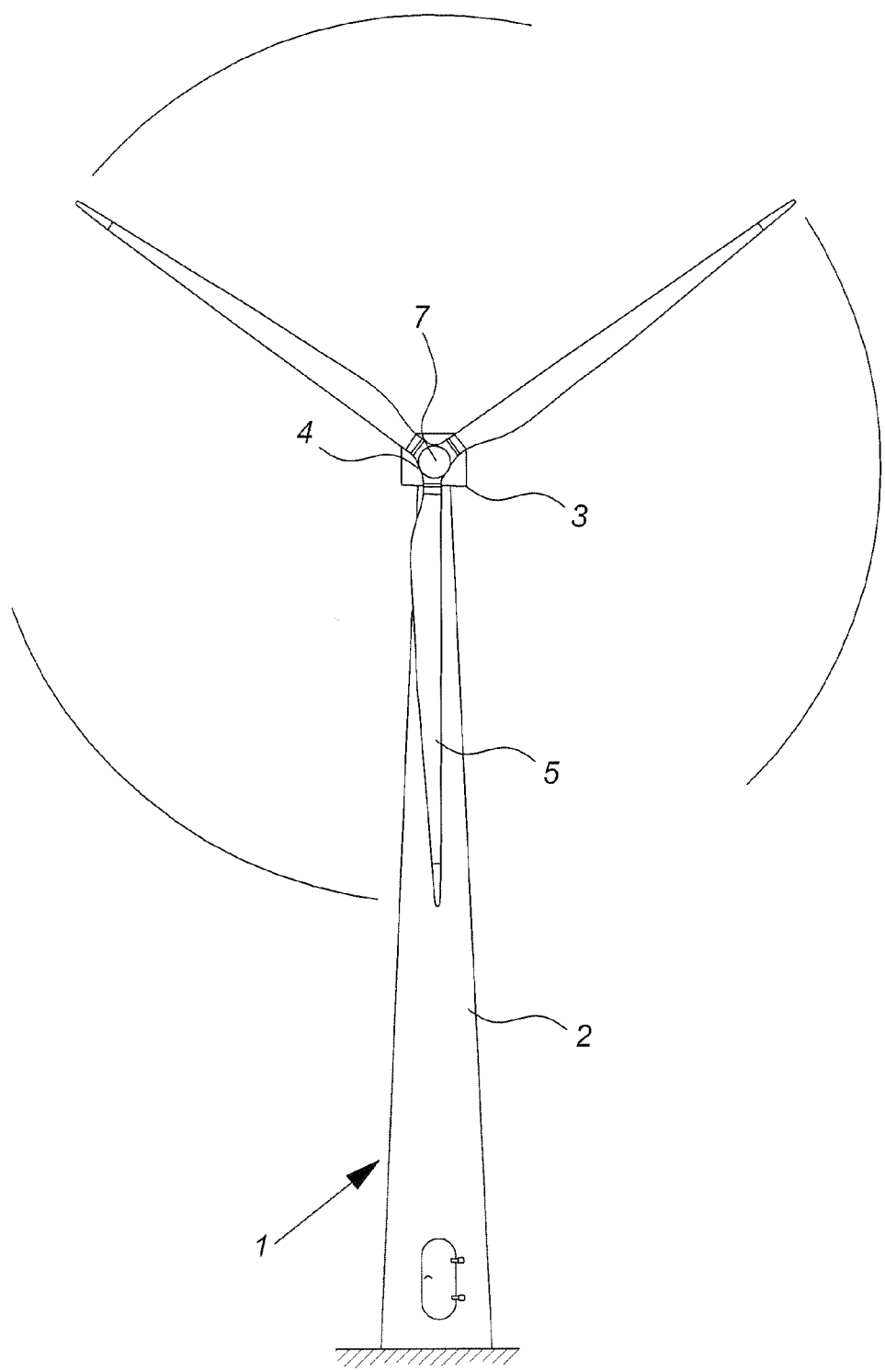
FIG. 1. illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
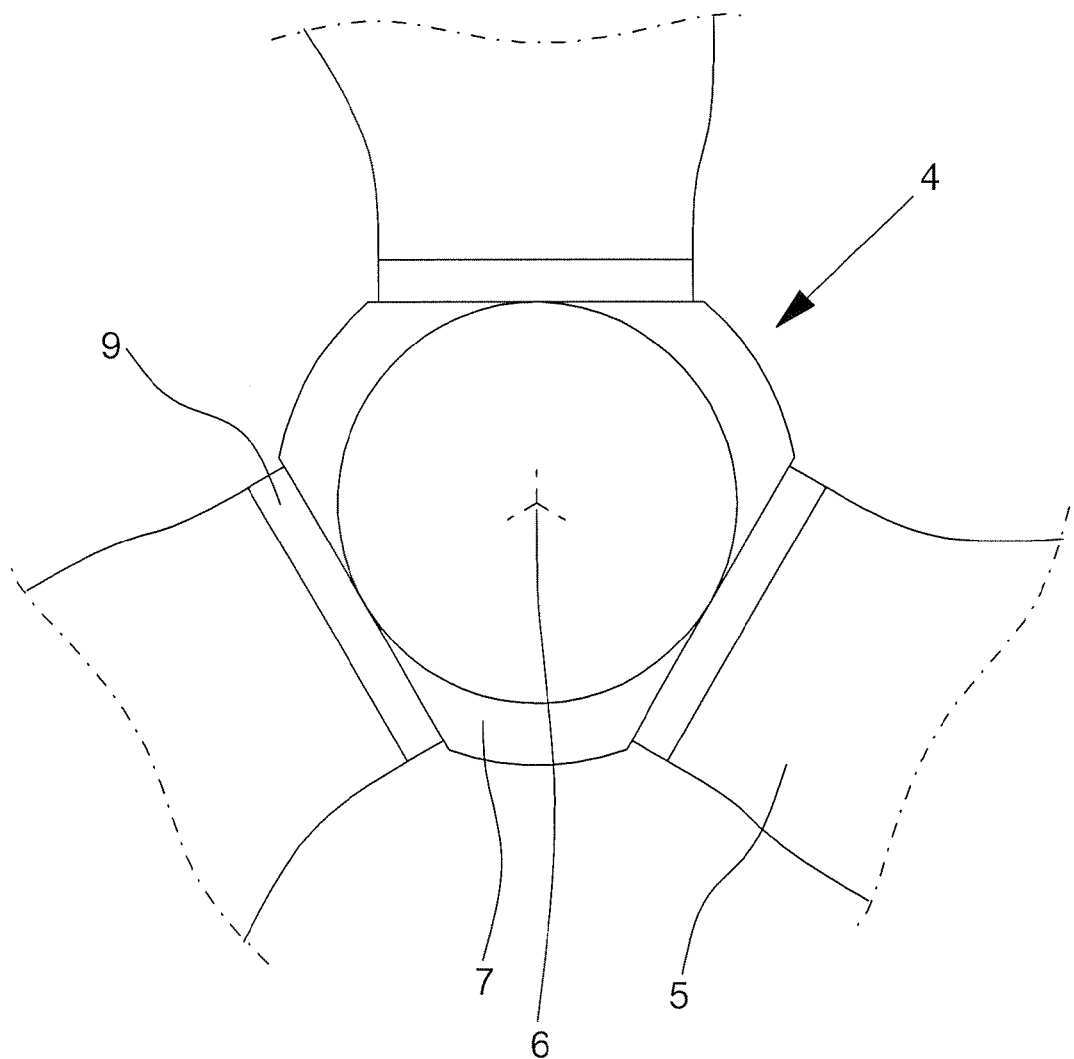
FIG. 2 illustrates a wind turbine hub comprising three blades as seen from the front.

FIG. 2 illustrates a wind turbine rotor 4 comprising a hub 7 and three blades 5 as seen from the front.

The pitch bearings 9 have to transfer forces mainly from three different sources. The blade 5 (and the bearings 9 themselves) is under the constant influence of the force of gravitation. The direction of the gravitational force varies depending on the blades position, inducing different loads on the pitch bearings 9. When the blade is in motion, the bearings 9 are also under the influence of a centrifugal force, which mainly produces an axial pull in the bearings 9. Finally, the bearings 9 are under the influence of the wind load on the blades 5. This force is by far the greatest load on the bearings 9 and it produces a massive moment, which the bearings 9 have to stand.

The load on and from all the pitch bearings 9 has to be transferred to the hub 7 and further into the rest of the wind turbine 1. This fact makes the load transferring between the pitch bearings 9 and the hub 7 very crucial, especially when the loads get higher due to larger blades and increased power output.

In this embodiment of the invention, the rotor 4 comprises three blades 5 but in another embodiment, the rotor 4 could comprise one, two, four or more blades 5. Each blade 5 is connected to the hub 7 through a pitch bearing 9 enabling the blade 5 to turn around its longitudinal axis.

At the centre of the hub 7 is illustrated the rotors axis of rotation 6 around which the entire rotor 4 rotates.

Figure 3:
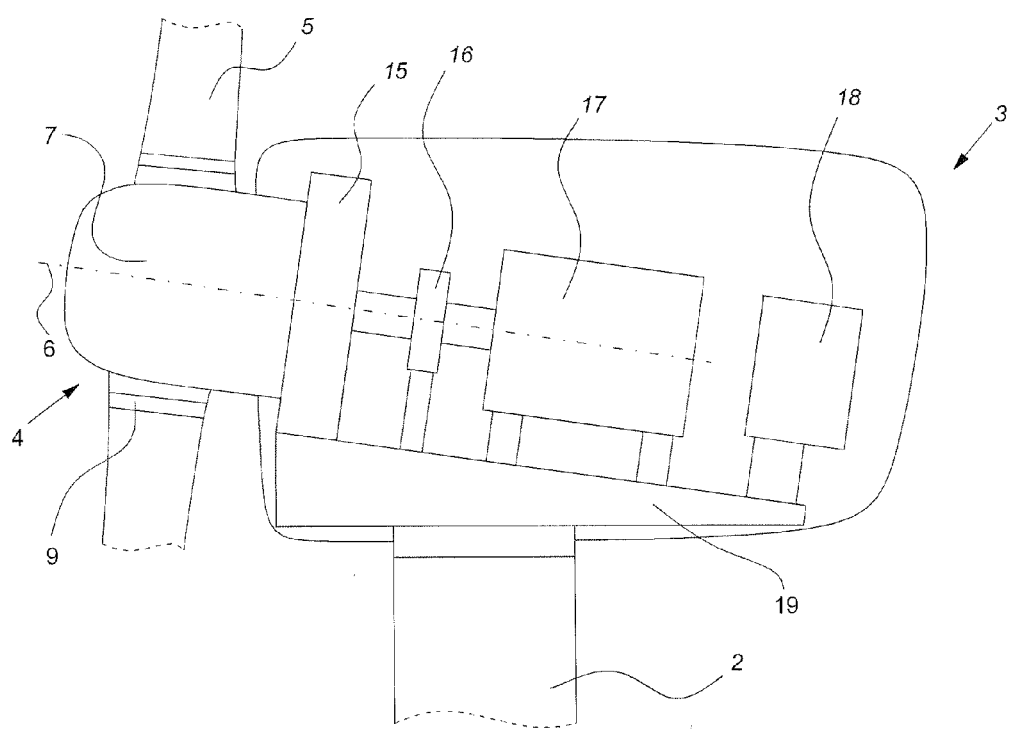
FIG. 3 illustrates a simplified cross section of a nacelle, as seen from the side.

FIG. 3 illustrates a simplified cross section of a nacelle 3 of a prior art wind turbine 1, as seen from the side. Nacelles 3 exists in a multitude of variations and configurations, but in most cases the drive train in the nacelle 3 almost always comprise one or more of the following components: a gearbox 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment, the load carrying nacelle structure 19 only extends along the bottom of the nacelle 3, for example, in the form of a bed frame to which some or all the components 15, 16, 17, 18 are connected. In another embodiment, the load carrying structure 19 could comprise a gear bell, which through a main bearing (not shown) could transfer the load of the rotor 4 to the tower 2. Alternatively, the load carrying structure 19 could comprise several interconnected parts such as latticework.

In this embodiment, the blades 5 of the wind turbine rotor 4 are connected to the hub 6 through pitch bearings 9, thereby allowing the blades 5 to rotate around their longitudinal axis.

The pitch angle of the blades 5 could then, for example, be controlled by linear actuators, stepper motors or other means for rotating the blades 5 (not shown) connected to the hub 6 and the respective blade 5.

Figure 4:
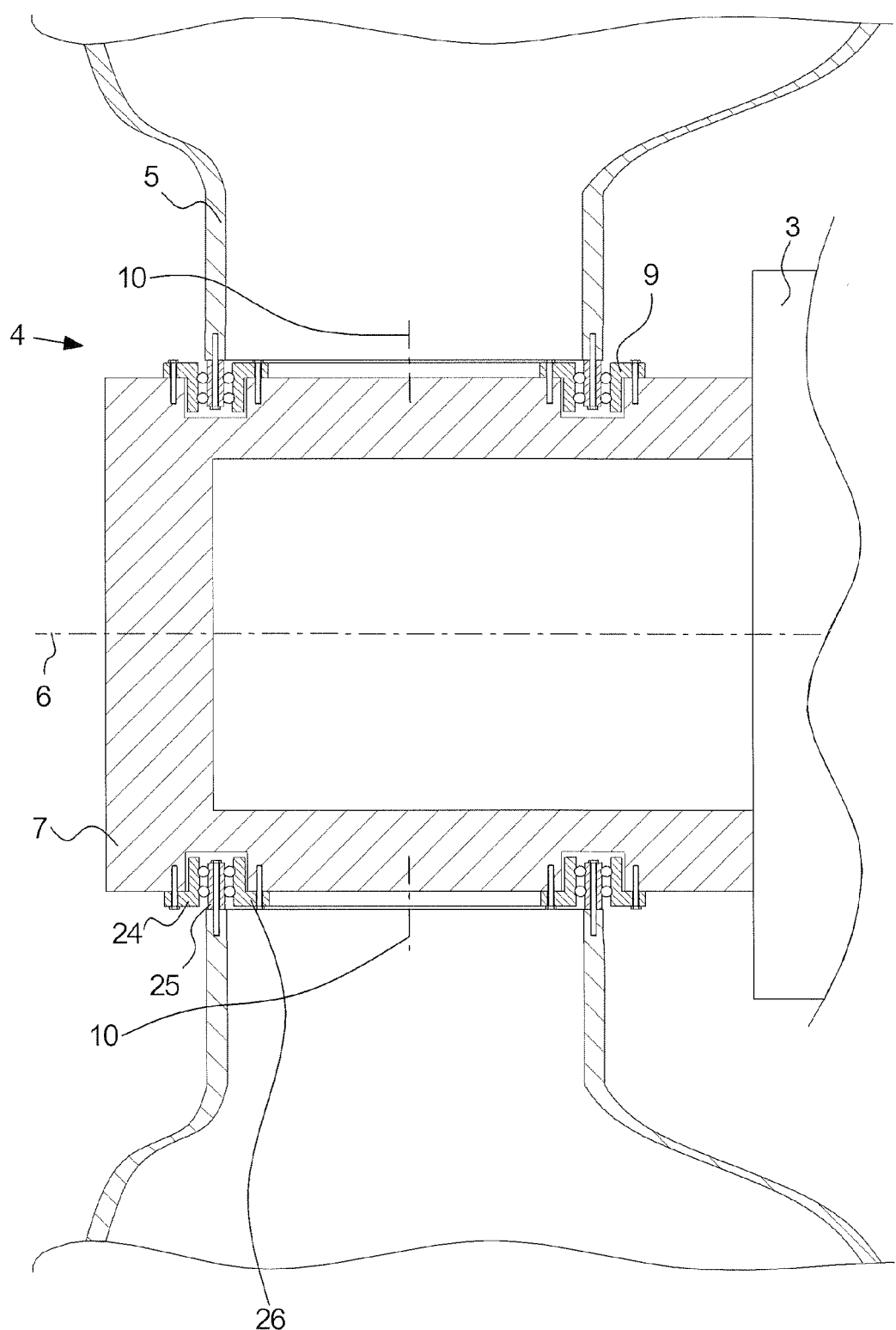
FIG. 4 illustrates a cross section of a wind turbine rotor, as seen from the side.

FIG. 4 illustrates a cross section of a wind turbine rotor 4, as seen from the side.

In this embodiment of the invention, the wind turbine rotor 4 comprises two blades 5 connected to the hub 7 through pitch bearings 9 in the form of two three ring bearings 9, each comprising an outer ring 24, a centre ring 25 and an inner ring 26.

In this embodiment, the outer ring 24 and the inner ring 26 are both connected directly to the hub 7 and the centre ring is connected to the blade 5. However, in another embodiment of the invention, the pitch bearing 9 could be flipped 180° so that the inner ring 26 and the outer ring 24 are connected to the blade 5 either directly or through a connection member (not shown), and the centre ring 25 is connected to the hub 7.

The pitch bearings 9 allow the centre ring 25 to rotate around the pitch bearings' axis of rotation 10 in relation to the inner ring 26 and outer ring 24 so that the blades 5 are also turned.

Figure 5:
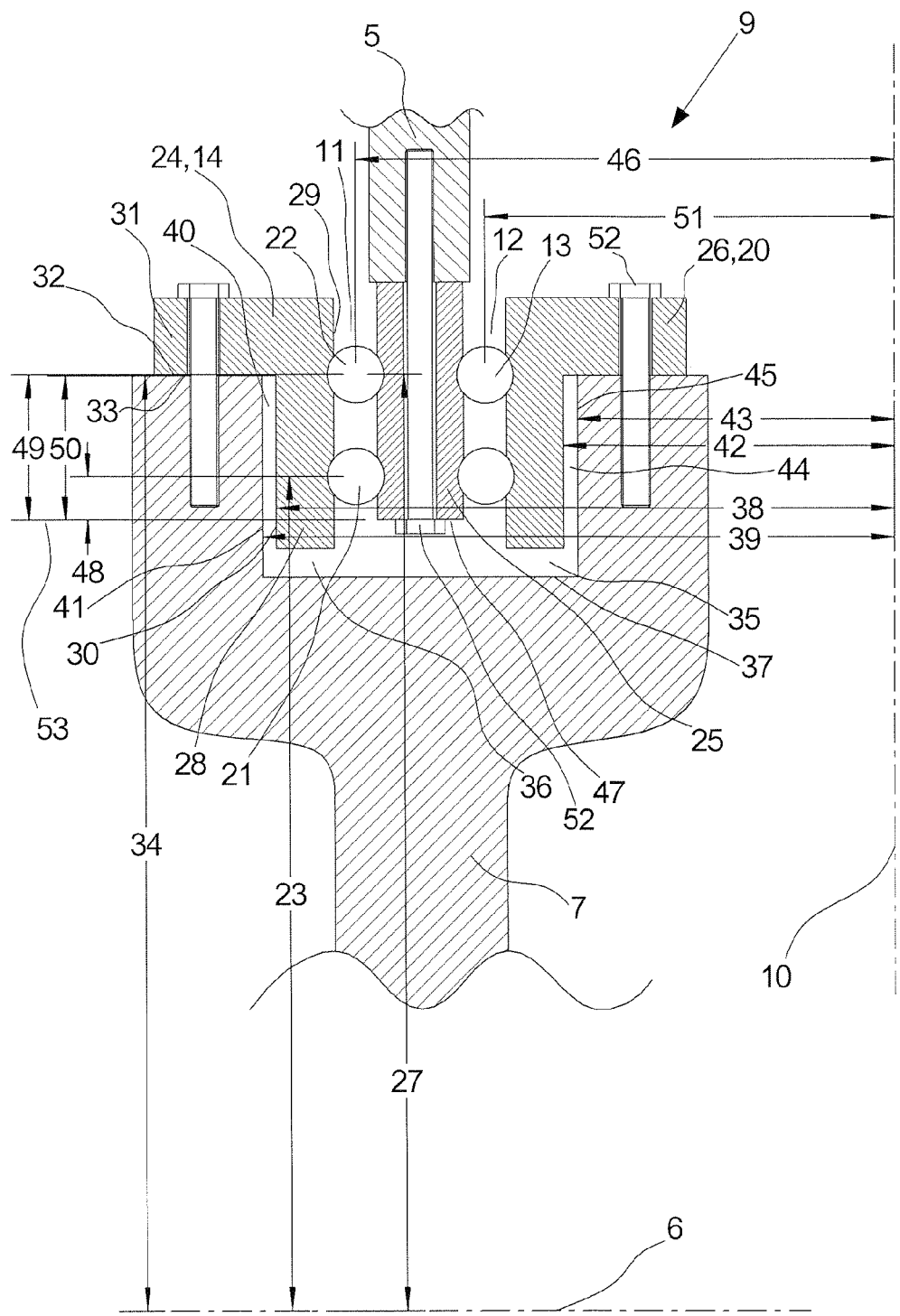
FIG. 5 illustrates a cross section of one side of a first embodiment of a pitch bearing comprising four rows of rolling elements and both outer and inner gap.

FIG. 5 illustrates a cross section of one side of a first embodiment of a pitch bearing 9 comprising four rows of rolling elements 13 and both outer and inner gap 40, 44.

In this embodiment of the invention, the pitch bearing 9 comprises a first rolling element arrangement 11 arranged between the centre ring 25 and the outer ring 24 at a first rolling element distance 46 from the pitch bearing axis of rotation 10. However, in another embodiment of the invention the first rolling element arrangement 11 could just as well be arranged between the centre ring 25 and the inner ring 26.

In this embodiment, the first rolling element arrangement 11 comprises two separate rows 21, 22 of rolling elements 13. In another embodiment, however, the first rolling element arrangement 11 could comprise three, four or more rows of rolling elements 13.

The pitch bearing 9 is also provided with a second rolling element arrangement 12 arranged between the centre ring 25 and the inner ring 26 at a second rolling element distance 51 from the pitch bearing axis of rotation 10. However, in another embodiment of the invention, the second rolling element arrangement 12 could just as well be arranged between the centre ring 25 and the outer ring 24.

In this embodiment, the second rolling element arrangement 12 also comprises two separate rows of rolling elements 13 making the inner ring 26 and the outer ring 24 identical mirrored parts. In another embodiment, however, the second rolling element arrangement 12 be formed different from the first rolling element arrangement 11—the second rolling element arrangement 12 could comprise one, three, four or more rows of rolling elements 13.

In this embodiment, the first row 21 of the first rolling element arrangement 11 is arranged at a first row distance 23 from the rotor axis of rotation 6 and the second row 22 of rolling elements 13 is arranged at a second row distance 27 from the rotor axis of rotation 6 so that the first row 21 is closer to the rotor axis of rotation 6 than the second row 22.

It should be noted that the rotor axis of rotation 6 and the pitch bearing axis of rotation 10 illustrated in FIGS. 5-9 are not shown in a realistic distance from the pitch bearing 9. As illustrated in FIG. 4, it is very likely that the rotor axis of rotation 6 and the pitch bearing axis of rotation 10 would be considerably further away from the pitch bearing 9.

In this embodiment of the invention, the first ring 14 of the pitch bearing 9, which in this case is the outer ring 24, comprises a support part 28 including a support face 29 which faces the centre ring 25. In this embodiment, the support face 29 is substantially parallel with the opposite and corresponding face of the centre ring 25. In another embodiment, however, one or both faces could be sloped, curved or in another way provided with features making them none-parallel.

One the other side of the support part 28, the support part 28 is provided with a back face 30 facing away from the centre ring 25. In this embodiment of the invention, the support face 29 and the back face 30 are parallel, besides for the two races in the support face 29, in which the rolling elements 13 of the first row 21 and the second row 22 runs, thereby providing the support part 28 with a substantial constant thickness in its entire axial extend. However, in another embodiment, the support face 29 or the back face 30 or both could be sloped, curved or in another way provided with features making the faces 29, 30 none-parallel.

In this embodiment, a contact surface part 31 protrudes from the back face 30 of the support part 28 in a direction away from the centre ring 25. An underside of the contact surface part 31, facing in a general axial direction towards the rotor axis of rotation 6 and the bottom surface plane 53, forms a contact face 32 which in this embodiment is fixed directly against a corresponding hub contact surface 33 by means of connection means 52. In this embodiment, both the contact face 32 and the hub contact surface 33 are even and level surfaces. In another embodiment, however, one or both of the surfaces 32, 33 could be sloped, curved or, for example, comprise matching protrusions and grooves, for example, to guide the bearing 9 or to centre the bearing 7 in relation to the hub 7.

The bottom surface plane 53 is perpendicular to the pitch bearing axis of rotation 10 and extends through the bottom surface 47 of the centre ring 25. In this embodiment, the entire bottom surface 47 also extends perpendicular to the pitch bearing axis of rotation 10 making the bottom surface plane 53 extend through the entire bottom surface 47. However, in another embodiment of the invention, the bottom surface 47 could be slanting, rounded, curved or in another way be other than completely parallel with the bottom surface plane 53. In such cases, the axial location of the bottom surface plane 53 is defined by the extreme point of the bottom surface 47, i.e., the point of the bottom surface 47 which extends furthest in the given axial direction.

In this embodiment of the invention, the contact face 32 is fixed directly against the hub contact surface 33, but in another embodiment one or more washers, a distance piece, vibrations dampers or other could be provided between the contact face 32 and the hub contact surface 33. In any event, the connection means 52 would ensure that the contact surface 33 is fixed towards the hub contact surface 33.

In this embodiment of the invention, the connection means 52, connecting the inner ring 26 and the outer ring 24 to the hub 7 and the centre ring 25 to the blade 5, are bolts. In another embodiment of the invention, however, the connection means 52 could be screws, rivets, stud bolts or any other kind of connectors suited for connecting pitch bearing rings 24, 25, 26 to wind turbine parts 5, 7.

The radial extend of the contact surface part 31 is so large that the entire outer ring 24 can be carried by the contact surface part 31 and all the connection means 52 can be arranged to penetrate only the contact surface part 31.

The contact surface parts 31 axial location on the back face 30 of the support part 28 may be pertinent in that the part of the support part 31 from which the contact surface part 31 protrudes will be considerably more rigid than the part of the support part 28 which is not supported by a support part 31. Thus, in the present embodiment, the upper part (i.e., the part furthest away from the rotor axis of rotation 6 and the bottom surface plane 53) of the support part 28 is considerably more rigid than the lower part.

The contact surface parts 31 is therefore positioned on the support part 28 so that the contact face 32 is further away from the rotor axis of rotation 6 and the bottom surface plane 53 than the first row of rolling elements 21. In this embodiment of the invention, the contact face 32 is arranged almost level with the second row of rolling elements 22. However, the contact face 32 would only have to be arranged further away from the rotor axis of rotation 6 and the bottom surface plane 53 than the first row of rolling elements 21 to achieve aspects of the invention. Preferably, the contact face 32 should be arranged further away from the rotor axis of rotation 6 and the bottom surface plane 53 than a middle point between the first row of rolling elements 21 and the second row of rolling elements 22. But, it should also be noted that the further away from the first row of rolling elements 21 the contact face 32 is arranged, the more flexible the lower part of the support part 28 becomes and if this part becomes too flexible, the first row of rolling elements 21 will not be able to transfer as great a load as the second row of rolling elements 22. Accordingly, the load transferred through the bearing 9 will therefore be less advantageously distributed between the row of rolling elements 21, 22.

In this embodiment of the invention, the pitch bearing 9 is arranged so that the "free" end of the support parts 28 of the inner ring 26 and the outer ring 24 extends into a depression 35 in the hub 7. In this embodiment, the depression 35 is formed as a groove formed integrally with the hub 7, but in another embodiment, the inner wall 45 and the outer wall 41 of the depression could be formed by one or more separate parts.

In this embodiment, the outer diameter 38 of the support part 28 of the outer ring 24 is smaller than the outer diameter 39 of the depression 35, thereby forming an outer gap 40 between the support part 28 of the outer ring 24 and the outer wall 41 of the depression 35 so that the "free" end of the support part 28 of the outer ring 24 may deflect more freely in the depression 35.

Likewise, the inner diameter 43 of the depression 35 is smaller than the inner diameter 42 of the support part 28 of the inner ring 26, thereby forming an inner gap 44 between the support part 28 of the inner ring 26 and the inner wall 45 of the depression 35 so that the "free" end of the support part 28 of the inner ring 26 also may deflect more freely in the depression 35.

To even further ensure that the support parts 28 of the inner ring 26 and the outer ring 24 may deflect more freely in the depression 35, the depression 35 and the support parts 28 are so formed that the deepest depth of the depression 35 is deeper than the greatest extend of the support parts 28 so a bottom gap 36 is formed between the bottom of the depression 35 and the support parts 28.

Figure 6:
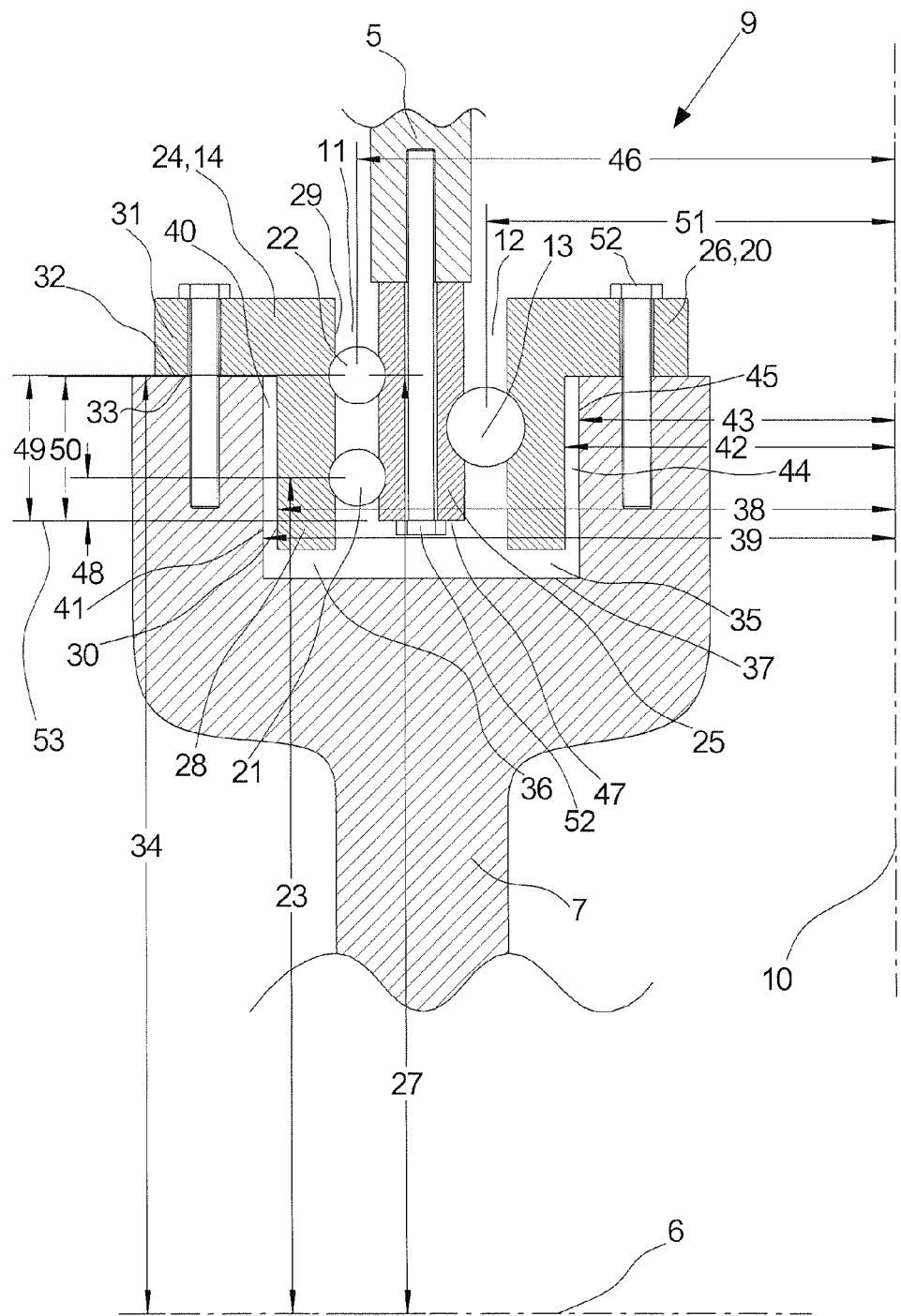
FIG. 6 illustrates a cross section of one side of a second embodiment of a pitch bearing comprising three rows of rolling elements.

FIG. 6 illustrates a cross section of one side of a second embodiment of a pitch bearing 9 comprising three rows of rolling elements 13.

In this embodiment of the invention, the pitch bearing 9 comprises a first rolling element arrangement 11 arranged between the centre ring 25 and the outer ring 24, and a second rolling element arrangement 12 arranged between the centre ring 25 and the inner ring 26.

In this embodiment, only the first rolling element arrangement 11 comprises two separate rows 21, 22 of rolling elements 13 in that the second rolling element arrangement 12 has only one row of rolling elements 13.

Although the second rolling element arrangement 12 comprises only one row of rolling elements 13, the inner ring 26 is still formed with a support part 28 and a contact surface part 31 as the outer ring 24. Since the second rolling element arrangement 12 comprises only one row of rolling elements 13, there is therefore no rows to distribute the load therebetween and the flexing ability of the inner ring 26 is therefore useless in relation to load distribution. However, a similar design of the inner 26 and the outer ring 24 could still be advantageous in that the flexing ability of the inner ring 26 in this embodiment could contribute to reduce stresses in the inner ring 26 during peak loads and contribute to reduce the consequences of misalignment and tolerance errors.

In this embodiment of the invention, all the rolling elements 13 in all the rows 21, 22 are balls. In another embodiment of the invention, however, some or all the rolling elements 13 could be rollers, needles or other members suitable for transferring loads substantially frictionless, or at least with very little friction, between the rings 24, 25, 26 of a pitch bearing 9.

Furthermore, in this embodiment of the invention, the rolling elements 13 in both the rows 21, 22 in the first rolling element arrangement 11 are of the same size and type. In another embodiment the rolling elements 13 in the first row 21 could be different from the size and/or type of the rolling elements 13 in the second row 22 or the first row 21 and/or the second row 22 could each comprise rolling elements 13 of different sizes and/or types. The same goes for the rolling elements 13 in the one or more rows in the second rolling element arrangement 12 illustrated in other figures.

Figure 7:
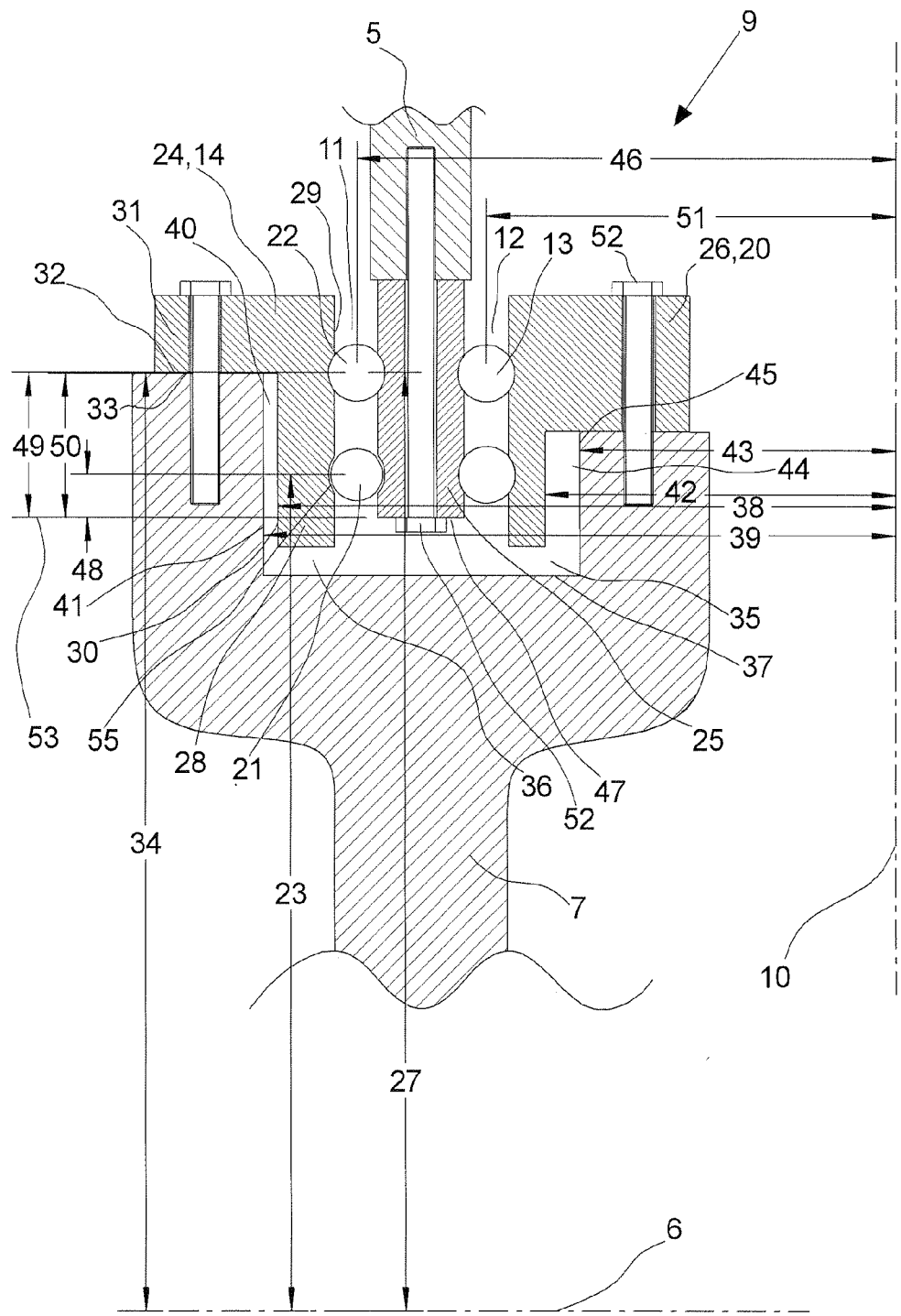
FIG. 7 illustrates a cross section of one side of a third embodiment of a pitch bearing comprising three rows of rolling elements and different outer and inner gap.

FIG. 7 illustrates a cross section of one side of a third embodiment of a pitch bearing 9 comprising three rows of rolling elements 13 and different outer and inner gap 40, 44.

In this embodiment of the invention, the pitch bearing 9 comprises a first rolling element arrangement 11 arranged between the centre ring 25 and the outer ring 24 at a first rolling element distance 46 from the pitch bearing axis of rotation 10, and a second rolling element arrangement 12 arranged between the centre ring 25 and the inner ring 26 at a second rolling element distance 51 from the pitch bearing axis of rotation 10.

In this embodiment of the invention, the inner ring 26 is formed differently than the outer ring 24 in that the contact face 32 of the inner ring 26 is considerably closer to the rotor axis of rotation 6 and the bottom surface plane 53 than the contact face 32 of the outer ring 24. All things being equal, this would reduce the flexibility of the "free" end of the support part 28 considerably and to compensate for this reduced flexibility, the radial extent of the "free" end of the support part 28 is reduced considerably in relation to support part 28 of the outer bearing ring 24. Thus, to achieve an optimal load distribution between the two rows of rolling elements 21, 22, it is important that the axial location for contact face 32 in relation to the radial thickness of the support part 28 matches the given nominal load that the bearing 9 is subject to.

In this embodiment of the invention, the first row of rolling elements 21 of the first rolling element arrangement 11 are made with greater play 55 than the second row of rolling elements 22 of the first rolling element arrangement 11. In this embodiment, this is done by forming the races of the first and second row 21, 22 substantially identically and by making the balls of the first row 21 at a slightly smaller diameter than the balls of the second row 22.

In another embodiment of the invention, greater play 55 could also be achieved by forming the rolling elements identically and then make the race of the first row 21 slightly larger than the race of the second row 22.

Figure 8:
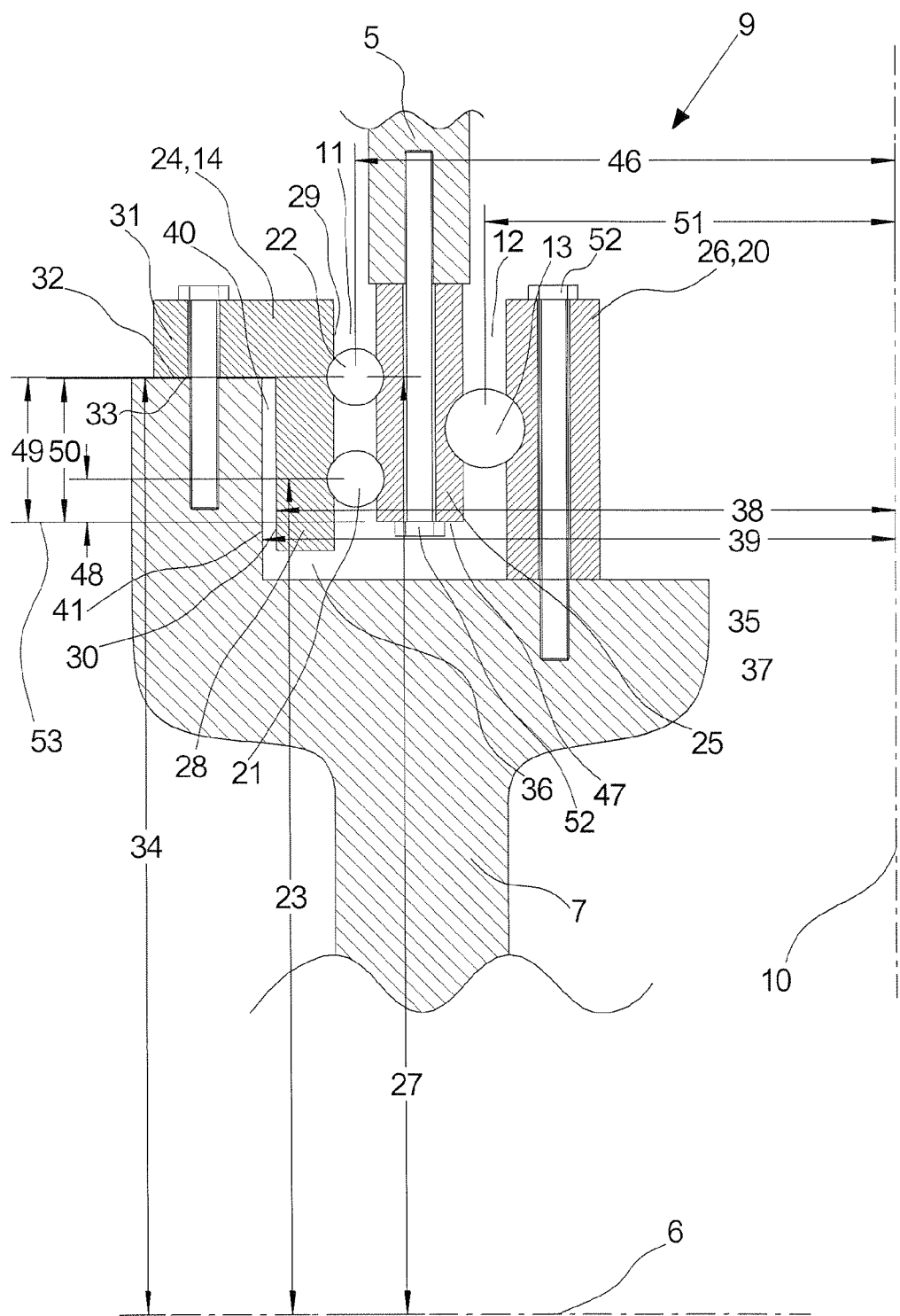
FIG. 8 illustrates a cross section of one side of a fourth embodiment of a pitch bearing comprising three rows of rolling elements and only an outer gap.

FIG. 8 illustrates a cross section of one side of a fourth embodiment of a pitch bearing 9 comprising three rows of rolling elements 13 and only an outer gap 40.

In this embodiment, only the first rolling element arrangement 11 comprises two separate rows 21, 22 of rolling elements 13 in that the second rolling element arrangement 12 has only one row of rolling elements 13.

Furthermore, in this embodiment, only the outer ring 24 is formed with a contact surface part 31 protruding from the back face 30 of a support part 28, in that the inner ring 26 is formed as a standard rectangular bearing ring, for example, to reduce the manufacturing costs of the inner ring 24 since the ring 24 only has to support one row of rolling elements and therefore has no use for the load distributing qualities of the bearing ring design according to embodiments of the invention.

Figure 9:
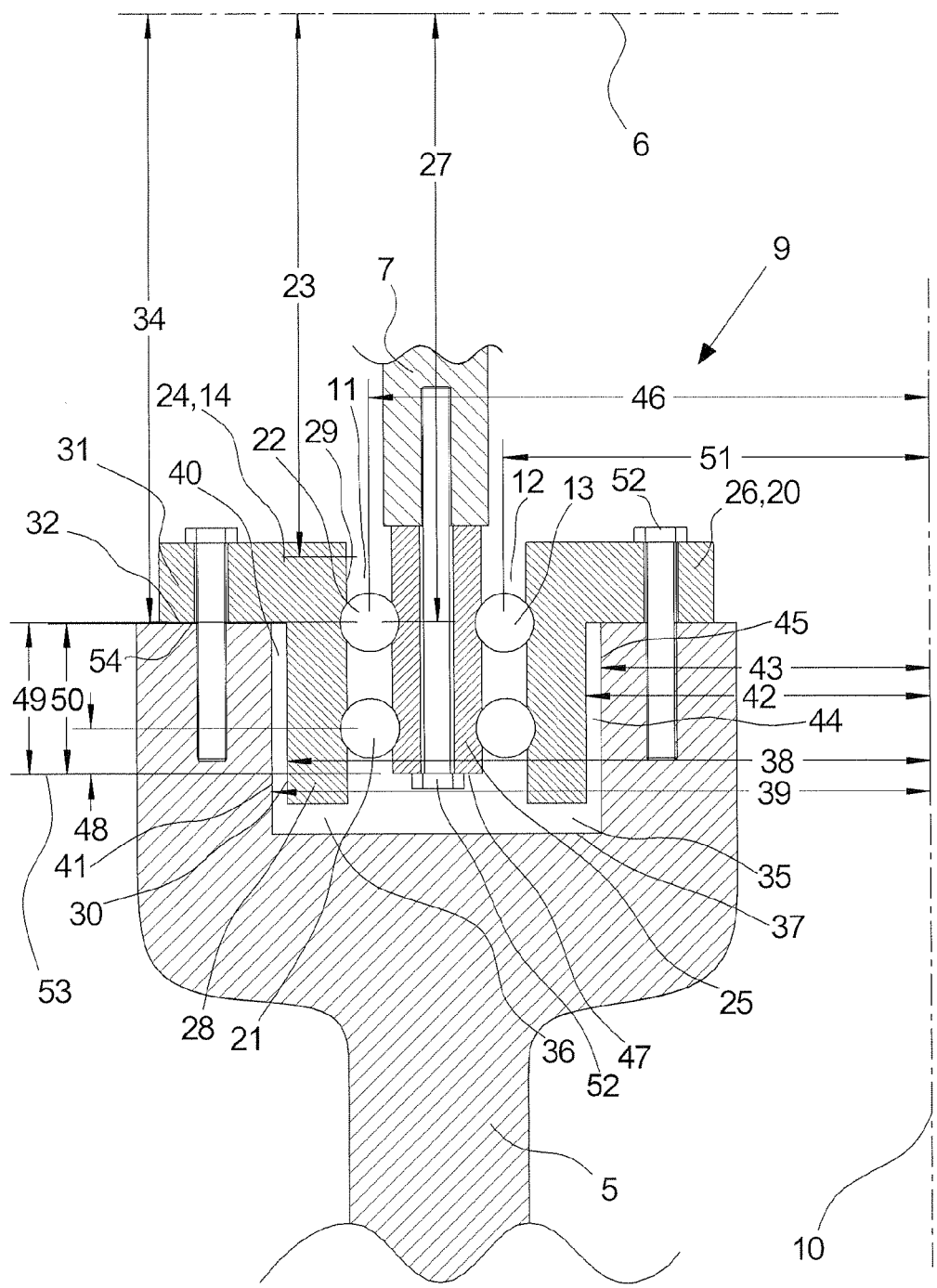
FIG. 9 illustrates a cross section of one side of the first embodiment of a pitch bearing where the centre ring is connected to the hub.

FIG. 9 illustrates a cross section of one side of the first embodiment of a pitch bearing 9 where the centre ring 25 is connected to the hub 7.

In all the previously illustrated embodiments of a pitch bearing 9, the centre ring 25 has been connected to the blade 5 and the inner ring 26 and the outer ring 24 have been connected to the hub. In this embodiment of the invention, the centre ring 25 is connected to the hub 7 and the inner ring 26 and the outer ring 24 are connected to the blade 5 in that the contact faces 32 of the inner ring 26 and the outer ring 24 are fixed directly against the blade contact surfaces 54 of the blade by means of bolts 52.

The invention has been exemplified above with reference to specific examples of designs and embodiments of wind turbines 1, wind turbine hubs 7 and pitch bearings 9. However, it should be understood that the invention is not limited to the particular examples described above but may be designed and altered in a multitude of varieties within the scope of the invention as specified in the claims.

What is claimed is:

1. A wind turbine, comprising:
    a rotor including an axis of rotation and further including at least one wind turbine blade connected to a rotor hub through at least one pitch bearing;
    said at least one pitch bearing comprising at least one outer ring, at least one centre ring and at least one inner ring, said at least one pitch bearing further comprising a first rolling element arrangement including at least two separate rows of rolling elements arranged between said centre ring and a first ring of said inner ring and said outer ring, and a second rolling element arrangement including at least one row of rolling elements arranged between said centre ring and a second ring of said inner ring and said outer ring;
    wherein a first row of said at least two separate rows of rolling elements is arranged at a first row distance from said rotor axis of rotation and wherein a second row of said at least two separate rows of rolling elements is arranged at a second row distance from said rotor axis of rotation and wherein said first row distance is smaller than said second row distance;
    wherein said first ring comprises a support part including a support face substantially facing said centre ring and including a back face substantially facing away from said centre ring;
    wherein said at least two separate rows of rolling elements are supported against said support face and wherein a contact surface part protrudes from said back face;
    wherein said contact surface part includes a contact face substantially facing in a general axial direction towards said rotor axis of rotation, wherein said contact face is fixed towards a corresponding hub contact surface, and wherein said contact face is arranged at a contact face distance from said rotor axis of rotation and wherein said first row distance is smaller than said contact face distance.

2. The wind turbine according to claim 1, wherein said support part extends into a depression of said hub or said blade.

3. A wind turbine according to claim 2, wherein said depression is formed integrally with said hub or said blade.

4. The wind turbine according to claim 2, wherein the deepest depth of said depression is deeper than the greatest extent of said support part, thereby forming a bottom gap between a bottom of said depression and said support part.

5. The wind turbine according to claim 2, wherein said outer ring comprises said support part and wherein an outer diameter of said support part is smaller than an outer diameter of said depression, thereby forming an outer gap between said support part of said outer ring and an outer wall of said depression.

6. The wind turbine according to claim 2, wherein said inner ring comprises said support part and wherein an inner diameter of said support part is greater than an inner diameter of said depression, thereby forming an inner gap between said support part of said inner ring and an inner wall of said depression.

7. The wind turbine according to claim 1, wherein said outer ring comprises said support part and said contact surface part, and wherein said contact face of said contact surface part is located further from an axis of rotation of said pitch bearing than said support part.

8. The wind turbine according to claim 1, wherein said inner ring comprises said support part and said contact surface part, and wherein said support part is located further from an axis of rotation of said pitch bearing than said contact face of said contact surface part.

9. The wind turbine according to claim 1, wherein both said inner ring and said outer ring comprise a support part and a contact surface part, and wherein said support part of said inner ring is located further from an axis of rotation of said pitch bearing than said contact face of said contact surface part of said inner ring and wherein said contact face of said contact surface part of said outer ring is located further from an axis of rotation of said pitch bearing than said support part of said outer ring.

10. The wind turbine according to claim 1, wherein the play of said first row of said at least two separate rows of rolling elements is greater than the play of said second row of said at least two separate rows of rolling elements.

11. A pitch bearing for a wind turbine, comprising:
at least one outer ring;
at least one centre ring, including a bottom surface and a bottom surface plane, wherein said bottom surface plane is perpendicular to an axis of rotation of said pitch bearing and extending through said bottom surface;
at least one inner ring;
said pitch bearing further comprising a first rolling element arrangement including at least two separate rows of rolling elements arranged between said centre ring and a first ring of said inner ring and said outer ring, and a second rolling element arrangement including at least one row of rolling elements arranged between said centre ring and a second ring of said inner ring and said outer ring;
wherein a first row of said at least two separate rows of rolling elements is arranged at a first row distance from said bottom surface plane and wherein a second row of said at least two separate rows of rolling elements is arranged at a second row distance from said bottom surface plane and wherein said first row distance is smaller than said second row distance;
wherein said first ring comprises a support part including a support face substantially facing said centre ring and including a back face substantially facing away from said centre ring;
wherein said at least two separate rows of rolling elements are supported against said support face and wherein a contact surface part protrudes from said back face;
wherein said contact surface part includes a contact face substantially facing in a direction towards said bottom surface plane; and
wherein said contact face is arranged at a contact face distance from said bottom surface plane and wherein said first row distance is smaller than said contact face distance.

12. The pitch bearing according to claim 11, wherein said outer ring comprises said support part and said contact surface part, and wherein said contact face of said contact surface part is located further from an axis of rotation of said pitch bearing than said support part.

13. The pitch bearing according to claim 11, wherein said inner ring comprises said support part and said contact surface part, and wherein said support part is located further from an axis of rotation of said pitch bearing than said contact face of said contact surface part.

14. The pitch bearing according to claim 11, wherein both said inner ring and said outer ring comprise a support part and a contact surface part, and wherein said support part of said inner ring is located further from an axis of rotation of said pitch bearing than said contact face of said contact surface part of said inner ring and wherein said contact face of said contact surface part of said outer ring is located further from an axis of rotation of said pitch bearing than said support part of said outer ring.

15. The pitch bearing according to claim 11, wherein the play of said first row of said at least two separate rows of rolling elements is greater than the play of said second row of said at least two separate rows of rolling elements.

16. A wind turbine, comprising:
a rotor including an axis of rotation and further including at least one wind turbine blade connected to a rotor hub through at least one pitch bearing;
said at least one pitch bearing comprising at least one outer ring, at least one centre ring and at least one inner ring, said at least one pitch bearing further comprising a first rolling element arrangement including at least two separate rows of rolling elements arranged between said centre ring and a first ring of said inner ring and said outer ring, and a second rolling element arrangement including at least one row of rolling elements arranged between said centre ring and a second ring of said inner ring and said outer ring;
wherein a first row of said at least two separate rows of rolling elements is arranged at a first row distance from said rotor axis of rotation and wherein a second row of said at least two separate rows of rolling elements is arranged at a second row distance from said rotor axis of rotation and wherein said second row distance is smaller than said first row distance;
wherein said first ring comprises a support part including a support face substantially facing said centre ring and including a back face substantially facing away from said centre ring;
wherein said at least two separate rows of rolling elements are supported against said support face and wherein a contact surface part protrudes from said back face;
wherein said contact surface part includes a contact face substantially facing in a general axial direction away from said rotor axis of rotation, wherein said contact face is fixed towards a corresponding blade contact surface; and
wherein said contact face is arranged at a contact face distance from said rotor axis of rotation and wherein said contact face distance is smaller than said first row distance.

17. The wind turbine according to claim 16, wherein said support part extends into a depression of said hub or said blade.

18. The wind turbine according to claim 17, wherein said depression is formed integrally with said hub or said blade.

19. The wind turbine according to claim 17, wherein the deepest depth of said depression is deeper than the greatest extent of said support part, thereby forming a bottom gap between a bottom of said depression and said support part.

20. The wind turbine according to claim 17, wherein said outer ring comprises said support part and wherein an outer diameter of said support part is smaller than an outer diameter of said depression, thereby forming an outer gap between said support part of said outer ring and an outer wall of said depression.

21. The wind turbine according to claim 17, wherein said inner ring comprises said support part and wherein an inner diameter of said support part is greater than an inner diameter of said depression, thereby forming an inner gap between said support part of said inner ring and an inner wall of said depression.

22. The wind turbine according to claim 16, wherein said outer ring comprises said support part and said contact surface part, and wherein said contact face of said contact surface part is located further from an axis of rotation of said pitch bearing than said support part.

23. The wind turbine according to claim 16, wherein said inner ring comprises said support part and said contact surface part, and wherein said support part is located further from an axis of rotation of said pitch bearing than said contact face of said contact surface part.

24. The wind turbine according to claim 16, wherein both said inner ring and said outer ring comprise a support part and a contact surface part, and wherein said support part of said inner ring is located further from an axis of rotation of said pitch bearing than said contact face of said contact surface part of said inner ring and wherein said contact face of said contact surface part of said outer ring is located further from an axis of rotation of said pitch bearing than said support part of said outer ring.

25. The wind turbine according to claim 16, wherein the play of said first row of said at least two separate rows of rolling elements is greater than the play of said second row of said at least two separate rows of rolling elements.

\* \* \* \* \*